United States Patent
Lee et al.

(10) Patent No.: US 11,738,325 B2
(45) Date of Patent: Aug. 29, 2023

(54) OIL ABSORBENT, METHOD FOR MANUFACTURING THE SAME, AND METHOD FOR REMOVING OIL FROM AQUEOUS PHASE USING THE SAME

(71) Applicants: THE INDUSTRY & ACADEMIC COOPERATION IN CHUNGNAM NATIONAL UNIVERSITY (IAC), Daejeon (KR); KOREA INSTITUTE OF ENERGY RESEARCH, Daejeon (KR)

(72) Inventors: Kyu Bock Lee, Daejeon (KR); Jae-Hak Choi, Daejeon (KR); Bon-Jun Ku, Daegu (KR); Byoung-Min Lee, Anyang-si (KR); Wang Lai Yoon, Daejeon (KR); Dong Joo Seo, Daejeon (KR)

(73) Assignees: THE INDUSTRY & ACADEMIC COOPERATION IN CHUNGNAM NATIONAL UNIVERSITY (IAC), Daejeon (KR); KOREA INSTITUTE OF ENERGY RESEARCH, Daejeon (KR)

( * ) Notice: Subject to any disclaimer, the term of this patent is extended or adjusted under 35 U.S.C. 154(b) by 71 days.

(21) Appl. No.: 17/445,920

(22) Filed: Aug. 25, 2021

(65) Prior Publication Data
US 2022/0062854 A1    Mar. 3, 2022

(30) Foreign Application Priority Data

Aug. 25, 2020 (KR) ..................... 10-2020-0106902

(51) Int. Cl.
*B01J 20/20* (2006.01)
*B01J 20/28* (2006.01)
(Continued)

(52) U.S. Cl.
CPC .......... *B01J 20/20* (2013.01); *B01J 20/2808* (2013.01); *B01J 20/28033* (2013.01);
(Continued)

(58) Field of Classification Search
None
See application file for complete search history.

(56) References Cited

U.S. PATENT DOCUMENTS

2017/0029733 A1* 2/2017 Felix ..................... B29C 48/832

FOREIGN PATENT DOCUMENTS

| CN | 106012525 A | * 10/2016 | ............ D06M 11/55 |
|---|---|---|---|
| JP | S49-005893 A | 1/1974 | |
| JP | 2005087863 A | * 4/2005 | |

OTHER PUBLICATIONS

K. Akato, Pretreatment and Pyrolysis of Rayon-based Precursor for Carbon fibers, MS Thesis, University of Tennessee (Knoxville), 2012, https://trace.tennessee.edu/utk_gradthes/1311 (Year: 2012).*

(Continued)

*Primary Examiner* — Chester T Barry
(74) *Attorney, Agent, or Firm* — Knobbe, Martens, Olson & Bear, LLP

(57) ABSTRACT

An oil adsorbent is manufactured by including performing heat treatment on a non-woven fabric for low-temperature carbonization, and has the effect of adsorbing and evaporating oil having various carbon numbers ranging from a low boiling point to a high boiling point to remove the oil, has photothermal conversion efficiency, high evaporation efficiency of oil by sunlight, and a high adsorption amount and high adsorption rate, thereby making the adsorption-evaporation cycle fast and efficiently performing the adsorption-evaporation, and has an environmentally friendly effect that does not cause any environmental problems even if the oil adsorbent is put into a river, a sea, or the like and then lost.

8 Claims, 10 Drawing Sheets

(51) Int. Cl.
  *B01J 20/30*   (2006.01)
  *C09K 3/32*    (2006.01)
  *C02F 1/28*    (2023.01)
  *C02F 101/32*  (2006.01)

(52) U.S. Cl.
  CPC ... *B01J 20/28083* (2013.01); *B01J 20/28085* (2013.01); *B01J 20/28092* (2013.01); *B01J 20/3078* (2013.01); *C02F 1/283* (2013.01); *C09K 3/32* (2013.01); *C02F 2101/32* (2013.01); *C02F 2303/16* (2013.01)

(56) References Cited

OTHER PUBLICATIONS

Office Action in Korean Application No. 10-2020-0106902 dated Mar. 4, 2022 in 4 pages.

* cited by examiner

OIL ABSORBENT, METHOD FOR MANUFACTURING THE SAME, AND METHOD FOR REMOVING OIL FROM AQUEOUS PHASE USING THE SAME

CROSS-REFERENCE TO RELATED APPLICATIONS

This application claims priority under 35 U.S.C. § 119 to Korean Patent Application No. 10-2020-0106902, filed on Aug. 25, 2020, in the Korean Intellectual Property Office, the disclosure of which is incorporated herein by reference in its entirety.

TECHNICAL FIELD

The following disclosure relates to an oil adsorbent, a method for manufacturing the same, and a method for removing oil from an aqueous phase using the same.

BACKGROUND

Water evaporation technologies using solar energy are receiving great attention as a clean energy saving technology for desalination and purification of polluted water. Specifically, there is a need to develop photothermal materials that absorb solar energy and converts the absorbed solar energy into thermal energy. Two types of photothermal materials are mainly used: a metal nanostructure having a "surface plasmonic effect" and a carbon nanomaterial having a "blackbody effect". Recently, the water evaporation technology using solar energy has not only been used in photocatalysis technology and sterilization technology, but has also been used in organic solvent purification technology, and thus, application area of the water evaporation technology is being expanded.

Meanwhile, crude oil spills release various hydrocarbon components that can threaten not only marine life but also mankind, and have a long-lasting effect on the ecosystem, which has caused concern around the world. As the production and consumption of petroleum products increase, the risk of oil spills increases, so technologies for reducing the damage caused by the oil spills are further required. Specifically, adsorbents based on polymers, natural materials, and cellulosic materials are being developed. These adsorbents should have high adsorption capacity, excellent buoyancy, adequate oil retention, and high lipophilic properties, and should also have properties of low cost, biodegradability, and non-toxicity.

The disclosure of this section is to provide background information relating to the present disclosure. Applicant does not admit that any information contained in this section constitutes prior art.

SUMMARY

An embodiment of the present invention is directed to providing an oil adsorbent capable of adsorbing oil having various carbon numbers ranging from a low boiling point to a high boiling point and removing the oil by evaporating the oil adsorbed to the adsorbent, and a method for removing oil from an aqueous phase using the same.

An embodiment of the present invention is directed to providing an oil adsorbent that has high photothermal conversion efficiency, high evaporation efficiency of oil by sunlight, and high adsorption amount and high adsorption rate to make an adsorption-evaporation cycle fast and effectively perform the adsorption-evaporation, and a method for removing oil from an aqueous phase using the same.

An embodiment of the present invention is directed to providing an eco-friendly oil adsorbent that does not cause an environmental problem even if the oil adsorbent manufactured by the manufacturing method according to embodiments of the present invention is put into a river, a sea, or the like and then lost, and a method for removing oil from an aqueous phase using the same.

An embodiment of the present invention is directed to providing an oil adsorbent having excellent buoyancy and stably drifting on a surface portion of an aqueous phase, and a method for removing oil from an aqueous phase using the same.

In one general aspect, a method for manufacturing an oil adsorbent includes: performing heat treatment on a non-woven fabric for low-temperature carbonization in an air atmosphere.

In addition, the oil adsorbent according to embodiments of the present invention is a low-temperature carbonized non-woven fabric and satisfies the following Equation 1. In the following Equation 1, O is the number of oxygen atoms in the oil adsorbent, and C is the number of carbon atoms in the oil adsorbent.

$$0.1 < O/C < 0.9 \qquad \text{[Equation 1]}$$

In an example of the present invention, the non-woven fabric may be cellulose-based fabric, and specifically may be cotton fabric.

In an example of the present invention, in the performing of the heat treatment, the low-temperature carbonization may be performed at 200 to 400° C.

In the oil adsorbent according to an example of the present invention, porosity may be 87 to 99%, and a total pore area may be 10 to 700 m$^2$/g.

The oil adsorbent according to an example of the present invention may have micropores of less than 2 nm, mesopores of 2 to 50 nm, and macropores of 50 nm or more.

In the oil adsorbent according to embodiments of the present invention, a light absorption rate may be 50 to 99% when light of 1 kW/m$^2$ is irradiated.

In another aspect, a method of purifying oil spilled into an aqueous phase by removing the oil spilled into the aqueous phase using the oil adsorbent according to the present invention includes adsorbing the oil by putting the oil adsorbent into the surface of the aqueous phase from which the oil has leaked, and evaporating the oil by irradiating light to the oil adsorbent to which the oil has been adsorbed.

In an example of the present invention, in the adsorbing, the oil adsorbent may be one in which oil is adsorbed in a state in which the aqueous phase and the oil phase are phase-separated, or the oil is adsorbed by being located at an interface between the aqueous phase and the oil phase.

In addition, the method for purifying oil leaked into an aqueous phase according to an embodiment of the present invention may further include recovering the oil adsorbent where the oil is adsorbed and evaporated after the evaporating.

In an example of the present invention, the oil contains an organic carbon compound having 3 to 23 carbon atoms.

DETAILED DESCRIPTION OF EMBODIMENTS

Figure 1:
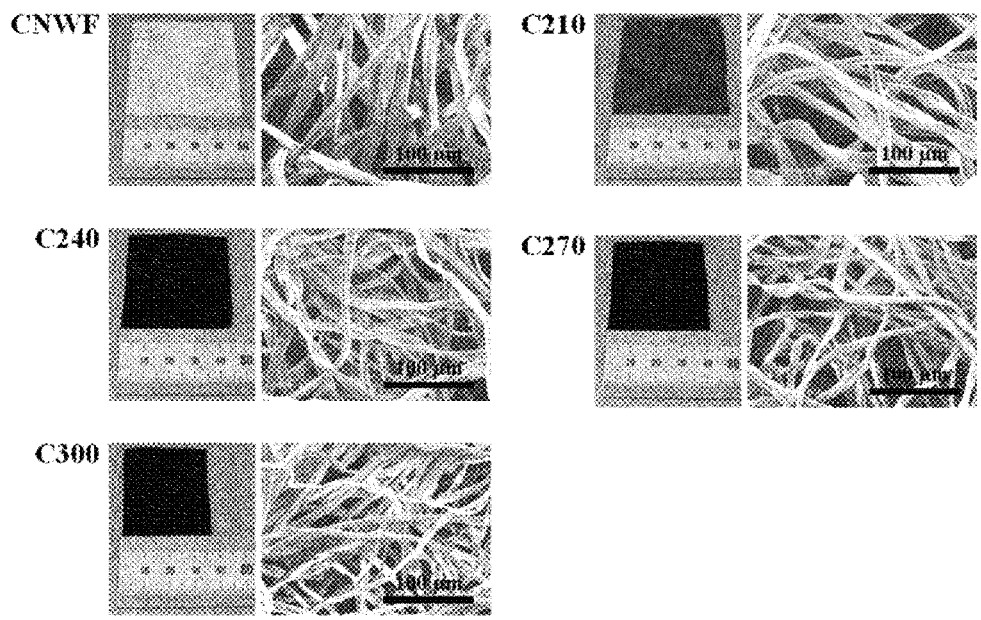
FIG. 1 is images obtained by observing surfaces of oil adsorbents of Example 1 (C210), Example 2 (C240), Example 3 (C270), Example 4 (C300), and Comparative Example 1 (CNWF) using a field emission scanning electron microscope (FE-SEM) (Merlin Compact, ZEISS, Germany).

Hereinafter, an oil adsorbent, a method for manufacturing the same, and a method for removing oil from an aqueous phase using the same according to embodiments of the present invention will be described in detail with reference to the accompanying drawings.

The drawings described in the present specification are provided by way of example so that the spirit of the present invention can be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

A singular form of a term used herein may be construed to include a plural form unless otherwise indicated.

Unless otherwise specified, the unit of % used in the present specification means % by weight unless otherwise specified.

As examples of adsorbent materials, inorganic minerals such as vermiculite, exfoliated graphite, sepiolite, and porous zeolite have a high adsorption capacity of 3-80 g/g. However, despite these advantages, these materials have poor buoyancy, so an adsorbent having excellent properties cannot be manufactured.

Organic materials, which are natural fibers such as cotton fibers, corn stalks, and nonwoven fabrics, are available at rich and affordable prices and are environmentally friendly. Considering the problem of plastic pollution in the ocean, it is advantageous to use natural materials as an adsorbent instead of synthetic polymers. The adsorption technology using these organic materials is based on a pore filling mechanism and provides a fast processing process, but the capacity of adsorption varies and is limited depending on a pore volume.

Accordingly, in order to improve the oil spills, embodiments of the present invention provide an oil adsorbent that introduces a new technology called solar-driven evaporation of oil combined with adsorption (SECA), and a method for removing oil from an aqueous phase using the same. Specifically, light oil and some heavy oil are evaporated by heat generated by photothermal conversion that converts solar energy into thermal energy, and the remaining heavy oil is adsorbed by the oil adsorbent, and the spilled oil is removed. To this end, the material should have high photothermal conversion properties, good buoyancy, oil wettability, and adsorption power. In addition, since oil spills cause damage to large seas, it is necessary to provide an adsorbent having advantages such as a low cost, a simple manufacturing process, light weight, a large specific surface area, and an excellent chemical resistance so that a large area can be treated. Since it is not enough for a material to simply have high adsorption properties, the material should have photothermal conversion properties so that a large amount of adsorbed oil can be able to be removed by evaporation.

Carbonization is a method of converting organic matter into light-adsorbing materials. Various carbon-based materials have been intensively studied as light absorbers for solar-based water evaporation, and carbon nanomaterials such as carbon nanotubes and graphene are used as carbon-based light absorbers, or polymers, biomass and organic precursors such as textiles were used. However, carbon nanomaterial-based materials are difficult to commercialize because they cannot afford large-scale oil spills, have high cost, and limited production capacity. In addition, the carbonization process itself also requires a high temperature, so energy and cost are too high.

Until now, an oil adsorbent for removing oil leaked into an aqueous phase has been studied in a direction to improve adsorption properties, such as an adsorption amount and an adsorption rate due to pore properties. However, the present inventor developed solar-driven evaporation of oil combined with adsorption (SECA) technology that recognizes that there is a limit to the removal of oil from the aqueous phase only by improving the adsorption properties.

In particular, the oil adsorbent according to embodiments of the present invention has not only excellent adsorption properties but also significantly excellent photothermal conversion properties, so that oil may be effectively evaporated by solar irradiation. Due to these properties, the oil adsorbent may be removed by continuously evaporating organic compounds having various carbon numbers ranging from a low boiling point to a high boiling point in the adsorbent. In addition, after the adsorption-evaporation (removal) is continuously performed, some high-boiling-point oil remaining in the adsorbent after evaporation to the limit can be effectively removed from an aqueous phase by finally recovering the adsorbent.

A method for manufacturing an oil adsorbent according to embodiments of the present invention for implementing the above-described effect includes performing heat treatment on the non-woven fabric for low-temperature carbonization in an air atmosphere.

The low-temperature carbonization referred to in this specification is carbonization in the air atmosphere, and is different from carbonization carried out in a generally known inert atmosphere. That is, the atmospheric condition during the low-temperature carbonization is not an inert (inactive) atmosphere such as nitrogen, argon atmosphere, or an atmosphere close to vacuum, which are generally defined atmospheric conditions for carbonization. The low-temperature carbonization may be carbonization performed at 400° C. or less in the air atmosphere, and specifically, may be performed at 200 to 400° C., in one embodiment, 220 to 300° C., in another embodiment, 250 to 300° C., in a further embodiment, 250 to 290° C. In embodiments of the present invention, when the low-temperature carbonization is performed at more than 300° C. or less than 200° C., the above-described effect cannot be properly implemented. Specifically, when the heat treatment of less than 200° C. is performed, the carbonization of the fabric does not proceed properly, and when the carbonization of more than 400° C. is performed, the photothermal conversion properties are lowered and the oil evaporation capacity due to the converted heat is lowered.

The composition and composition ratio of the oil adsorbent may satisfy the following Formula 1, in one embodiment, the following Formula 2, in another embodiment, the following Formula 3, and in a further embodiment, the following Formula 4. In the following Equation 1, O is the number of oxygen atoms in the oil adsorbent, and C is the number of carbon atoms in the oil adsorbent. When this is satisfied, the high adsorption capacity is maintained due to pore properties, while the photothermal conversion properties are improved and the oil evaporation capacity is improved due to the photothermal conversion properties. Also, as a non-limiting example, the oil adsorbent may have a carbon content of 60 to 85%, specifically 65 to 80%, more specifically 72 to 80%, even more specifically 72 to 73.5%, and may be an oxygen content of 20 to 40%, specifically 20 to 35%, more specifically 20 to 28%, and even more specifically 26.5 to 28%.

$$0.1 < O/C < 0.9 \quad \text{[Equation 1]}$$

$$0.36 < O/C < 0.70 \quad \text{[Equation 2]}$$

$$0.35 < O/C < 0.45 \quad \text{[Equation 3]}$$

$$0.36 < O/C < 0.39 \quad \text{[Equation 4]}$$

The non-woven fabric is not limited as long as it achieves the purpose of embodiments of the present invention, but may be cellulose-based fabric, and specifically may be cotton fabric. The non-woven fabric is low-temperature carbonized and, in one embodiment, has porosity sufficient to satisfy the pore properties described above. Specifically, the oil adsorbent may have various pore structures, for example, the pore diameter may be 0.4 nm to 400 µm. In one embodiment, the oil adsorbent may have micropores of less than 2 nm, mesopores of 2 to 50 nm, and macropores of 50 nm or more in terms of adsorption property and structural stability improvement. In addition, the oil adsorbent may have a porosity of 87 to 99%, specifically 90 to 99%, and a total pore area of 10 to 700 $m^2/g$, specifically 50 to 300 $m^2/g$. The diameter of the non-woven fabric constituting the oil adsorbent is not particularly limited as long as it has the above-mentioned pore properties, but may be, for example, 10 to 30 µm. When this is satisfied, the adsorbent has high adsorption capacity as well as excellent structural stability, so that it can stably drift on the aqueous phase for a long time. As an embodiment, a cellulose-based nonwoven fabric satisfying the above-described pore properties may be provided as an example.

The fabric is a non-woven fabric, and is woven with fibers that may have the above-described pore properties after low-temperature carbonization. The fibers may be cellulose-based fibers, and specific examples of the fibers may include seed fibers such as cotton and kapok, bast fibers such as flax, hemp, hemp, and jute, leaf fibers such as manila hemp and sisal hemp, fruit fibers such as palm fibers, and the like. In one embodiment, the cellulose-based fabric is a cotton fabric, which satisfies the above-described pore properties, compositional properties, and the like and is good in terms of being able to properly implement the above-described effects.

The standard, size, and shape of the non-woven fabric are not limited because they can be easily changed appropriately depending on the scale of use of the adsorbent and the specific use of the adsorption. The form of the non-woven fabric, and for example, the form of the adsorbent may be in the form of a sheet having a predetermined thickness in terms of allowing the oil adsorbent to stably drift on the surface of the aqueous phase.

As described above, the oil adsorbent prepared by the manufacturing method according to embodiments of the present invention has high adsorption capacity and, in particular, very excellent photothermal conversion properties, and is effective for evaporation and removal of the adsorbed oil. Specifically, the oil adsorbent according to embodiments of the present invention may have a light adsorption rate of 50 to 99%, in one embodiment, 70 to 99%, when light of 1 kW/m$^2$ is irradiated.

The purification method of the oil leaked into the aqueous phase according to embodiments of the present invention for removing the oil leaked into the aqueous phase using the oil adsorbent includes adsorbing the oil by putting the oil adsorbent into the surface of the aqueous phase from which the oil has leaked, and evaporating (or decomposing) the oil by irradiating light to the oil adsorbent to which the oil has been adsorbed.

In an example of the present invention, in the adsorbing, the oil adsorbent may be one in which oil is adsorbed in a state in which the aqueous phase and the oil phase are phase-separated, or the oil is adsorbed by being located at an interface between the aqueous phase and the oil phase.

In addition, the method for purifying oil leaked into an aqueous phase according to an embodiment of the present invention may further include recovering the oil adsorbent where the oil is adsorbed and evaporated after the adsorbing or after the evaporating.

In the case where the above-described oil adsorbent is used to induce adsorption and evaporation of oil when irradiated with light, the oil may include an organic carbon compound having 3 to 23 carbon atoms. Specifically, the oil contains a wide range of carbon atoms, such as organic carbon compounds (gasoline or the like) having 3 to 9 carbon atoms, organic carbon compounds (kerosene or the like) having 10 to 13 carbon atoms, and organic carbon compounds (diesel oil or the like) having 14 to 23 carbon atoms.

Hereinafter, the present invention will be described in detail by way of examples, but these are for describing the present invention in more detail, and the scope of the present invention is not limited by the following examples.

Example 1

An oil adsorbent (C210) was manufactured by low-temperature carbonizing cotton non-woven fabrics (35 g/m, Namyang fabric) with a width and length of 7 cm at 210° C. at a heating rate of 3° C./min for 2 hours under the air atmosphere conditions in a muffle furnace, and then naturally cooling the low-temperature carbonized cotton non-woven fabrics at room temperature of 25° C.

Example 2

An oil adsorbent (C240) was manufactured in the same manner as in Example 1, except that the low-temperature carbonization temperature in Example 1 was changed to 240° C.

Example 3

An oil adsorbent (C270) was manufactured in the same manner as in Example 1, except that the low-temperature carbonization temperature in Example 1 was changed to 270° C.

Example 4

An oil adsorbent (C300) was manufactured in the same manner as in Example 1, except that the low-temperature carbonization temperature in Example 1 was changed to 300° C.

Comparative Example 1

<Comparative Example 1> In Example 1, the non-woven fabric without low-temperature carbonized itself was used as an oil adsorbent (Pristine, CNWF).

<Surface Formation Color Analysis>

FIG. 1 illustrates images obtained by observing surfaces of oil adsorbents of Example 1 (C210), Example 2 (C240), Example 3 (C270), Example 4 (C300), and Comparative Example 1 (CNWF) using a field emission scanning electron microscope (FE-SEM) (Merlin Compact, ZEISS, Germany).

As illustrated in FIG. 1, the oil adsorbent (CNWF), which is an untreated nonwoven fabric of Comparative Example 1, is composed of randomly arranged flat-shaped cotton fibers to represent the surface of cellulose Iβ-type cotton fibers, that is, cellulose-based non-woven fabric. In the case of the oil adsorbent (CNWF), which is the low-temperature carbonized cotton non-woven fabric of Example 2 (C240), Example 3 (C270), and Example 4 (C300), the color of the surface of the CNWF was changed from white to black, and the shape of the fiber was well maintained. The change in color change of the surface is determined to be due to the removal of non-carbon atoms and dehydration of the cellulose main chain during the low-temperature carbonization.

<Crystal Structure Analysis>

Figure 2:
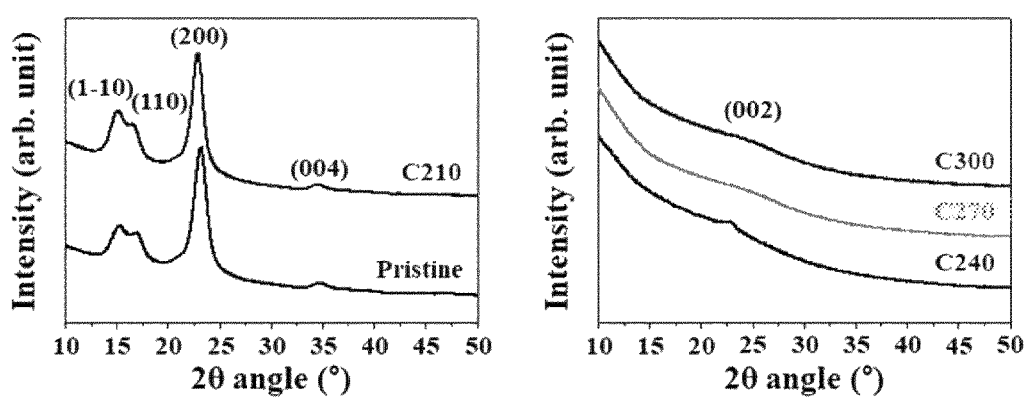
FIG. 2 is XRD pattern graphs obtained by observing the oil adsorbents of Example 1 (C210), Example 2 (C240), Example 3 (C270), Example 4 (C300), and Comparative Example 1 (Pristine) using X-ray diffraction (XRD).

FIG. 2 illustrates results of analyzing (2θ=5 to 60°, CuKα radiation) crystal structures of the oil adsorbents of Example 1 (C210), Example 2 (C240), Example 3 (C270), Example 4 (C300), and Comparative Example 1 (Pristine) using X-ray diffraction (XRD) (X'Pert Pro Multi-Purpose, PANalytical, Netherlands).

As illustrated in the left side of FIG. 2, the oil adsorbent (CNWF), which is an untreated nonwoven fabric of Comparative Example 1, showed typical peaks at 2θ=15.3, 16.8, 23.1, and 34.8° with respect to the (110), (1-10), (200) and (004) planes, which corresponds to unique monoclinic crystal structures of cellulose type Iβ cotton fibers, that is, cellulose-based non-woven fabric respectively. In the case of the oil adsorbent of Example 1 (C210), this peak was maintained even after thermal stabilization at 210° C. because thermal stabilization at a low temperature was not sufficient to degrade the crystal structure of the fiber. In the right side of FIG. 2, the oil adsorbent (C240) of Example 2 shows a peak at 2θ=23°, which showed that an aromatic structure was formed in the cotton fiber due to the cyclization reaction during the thermal stabilization. In the case of the oil adsorbent (C270) of Example 3 and the oil adsorbent (C300) of Example 4, the peak disappeared due to thermal decomposition of the crystal structure. This mean that the broad peak with respect to the (002) graphite plane was concentrated at about 25°, and a partial graphite-like structure was formed after the thermal stabilization.

<Elemental Composition and Chemical Properties Analysis>

FIGS. 3 to 8 illustrate results of investigating changes in elemental compositions and chemical structures of the oil adsorbents of Example 1 (C210), Example 2 (C240), Example 3 (C270), Example 4 (C300), and Comparative Example 1 (Pristine) using X-ray photoelectron spectroscopy (XPS) (MultiLab 2000, ThermoElectron Corporation, UK).

Figure 3:
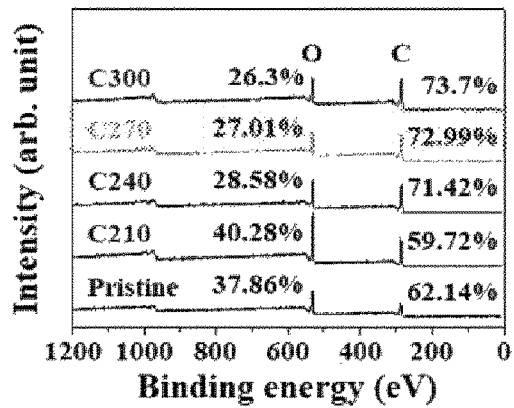
FIG. 3 is XPS spectra obtained by measuring changes in elemental compositions and chemical structures of the oil adsorbents of Example 1 (C210), Example 2 (C240), Example 3 (C270), Example 4 (C300), and Comparative Example 1 (Pristine) using X-ray photoelectron spectroscopy (XPS).

FIG. 3 illustrates C (285 eV) and O (586 eV) peaks of all samples. In the case of the oil adsorbent (CNWF), which is the untreated nonwoven fabric of Comparative Example 1, the atomic contents of C and O were 62.14% and 37.86%, respectively. In the case of the oil adsorbent (C210) of Example 1, the O content increased to 40.28%, while the C content decreased to 59.72% during the low-temperature thermal stabilization process. However, in the case of the oil adsorbent (C300) of Example 4, as the thermal stabilization temperature increased, the O content decreased to 26.3% while the C content gradually increased to 73.7%. That is, the ratio of O/C was 0.6 in Comparative Example 1 (CNWF) and decreased to 0.35 in Example 4 (C300).

Figure 4:
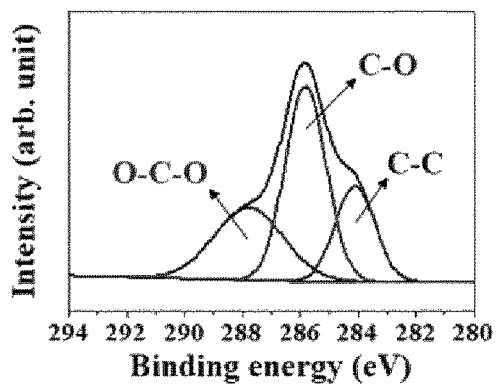
FIGS. 4 to 8 are XPS spectra of Comparative Example 1 and Examples 1 to 4, respectively.
Figure 5:
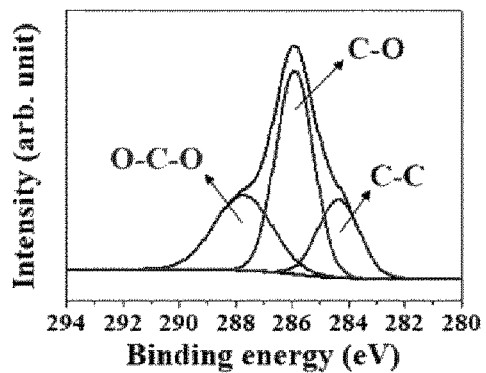
Figure 6:
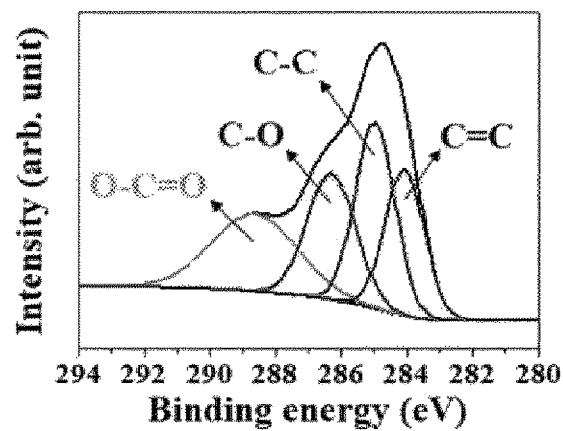
Figure 7:
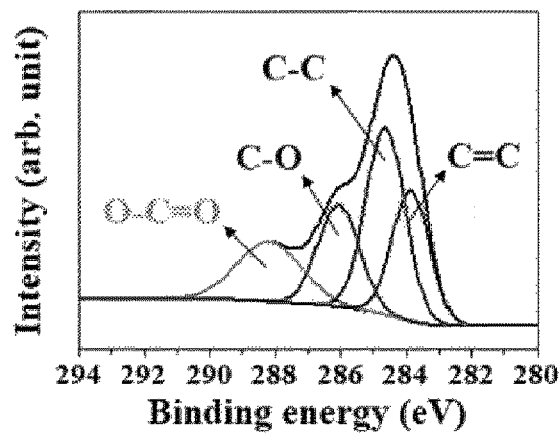
Figure 8:
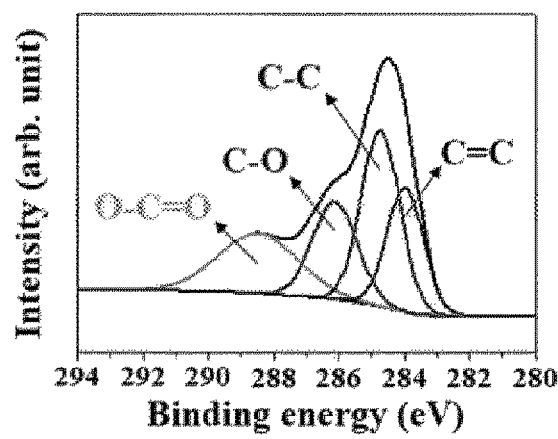
Figure 9:
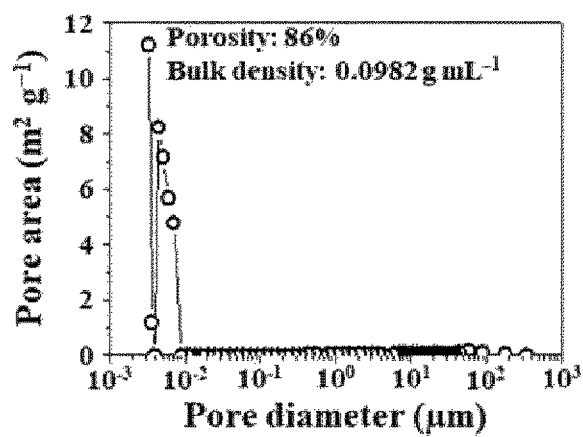
FIGS. 9 to 13 are diagrams illustrating results of measuring pore size distributions, pore areas, porosities, and bulk densities of Comparative Example 1 and Examples 1 to 4, respectively, by Hg porosimetry (Auto Pore IV 9520, Micromeritics, USA).
Figure 10:
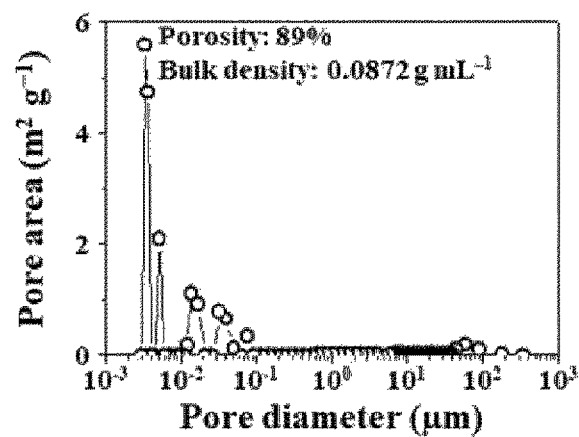
Figure 11:
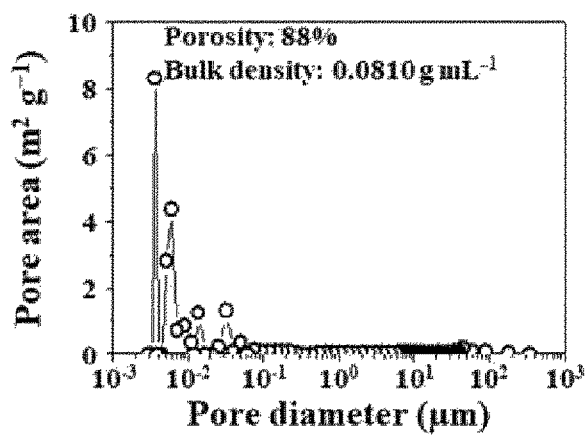
Figure 12:
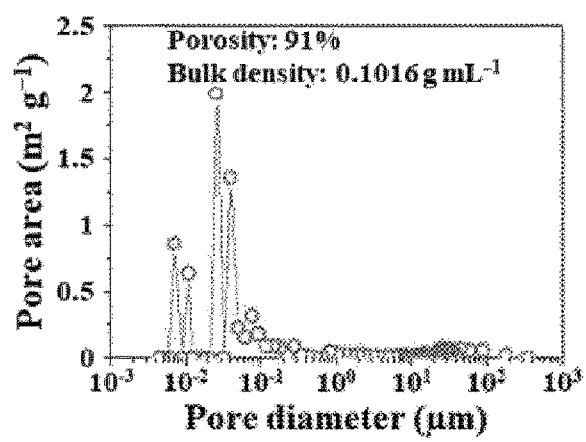
Figure 13:
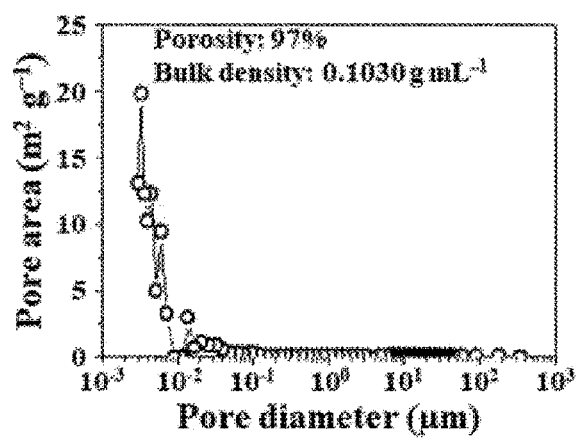

FIG. 4 illustrates a narrow XPS spectrum of the oil adsorbent (CNWF), which is the untreated nonwoven fabric of Comparative Example 1, FIG. 5 illustrates a narrow XPS spectrum of the oil adsorbent (C210) of Example 1, FIG. 6 illustrates a narrow XPS spectrum of the oil adsorbent (C240) of Example 2, FIG. 7 illustrates a narrow XPS spectrum of the oil adsorbent (C270), and FIG. 8 illustrates a narrow XPS spectrum of Cl of the oil adsorbent (C300) of Example 4. The characteristic peaks associated with Comparative Example 1 (CNWF) are 287.78 eV (O—C—O), 285.83 eV (C—O) and 284.08 eV (C—C), respectively. In the case of Example 1 (C210), O—C—O and C—O bonds were relatively increased compared to C—C bonds due to surface oxidation of cotton fibers during the low-temperature thermal stabilization. In the case of Example 3 (C240) and Example 4 (C300) with the low-temperature carbonization temperature of 240° C. or higher, C=C and O—C=O bonds appeared due to the aromatic structures formed by dehydration, depolymerization and cyclization reactions in cotton fibers after the thermal stabilization.

<Analysis of Pore Properties>

The pore properties of the oil adsorbents of Example 1 (C210), Example 2 (C240), Example 3 (C270), Example 4 (C300), and Comparative Example 1 (CNWF), specifically, the pore size distributions, the pore areas, the porosities, and the bulk densities thereof were analyzed by Hg porosimetry (Auto Pore IV 9520, Micromeritics, USA).

The pore size distribution, the pore area, the porosity, and the bulk density were analyzed by the Hg porosimetry (Auto Pore IV 9520, Micromeritics, USA) and a diffuse reflectance UV-Vis-NIR spectrometer (SolidSpec-3700, Shimadzu Co., Ltd, Japan) was used to characterize the light adsorption properties.

Figure 14:
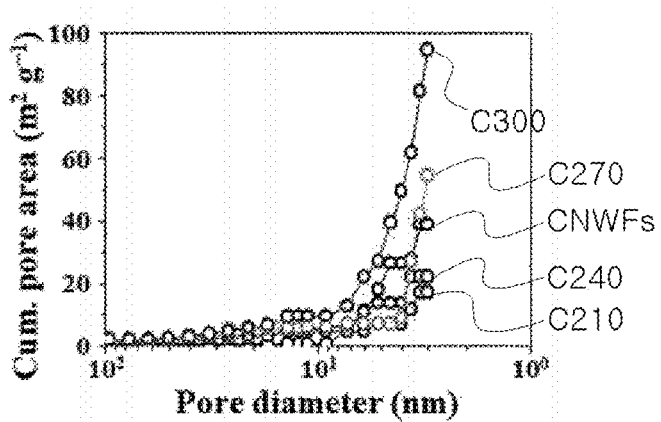
FIG. 14 is a diagram illustrating results of measuring pore diameters of Examples 1 (C210), Example 2 (C240), Example 3 (C270), Example 4 (C300), and Comparative Example 1 (CNWF).

FIGS. 9 to 14 are diagrams illustrating results of measuring the pore size distributions, the pore areas, the porosities, and the bulk densities of the oil adsorbents of Comparative Example 1 and Examples 1 to 4, respectively, by the Hg porosimetry (Auto Pore IV 9520, Micromeritics, USA). FIGS. 9 to 13 illustrate the pore size distributions of Comparative Example 1 (CNWF), Example 1 (C210), Example 2 (C240), Example 3 (C270), and Example 4 (C300) in order, and FIG. 14 illustrates the pore diameters thereof.

All samples had a bimodal pore size distribution, and had mesopores (2 to 50 nm) and macropores (greater than 50 nm). As illustrated in FIGS. 9 to 13, Comparative Example 1 (CNWF) had pore diameters ranging from 3 to 10 nm and 100 to 400 μm, and as the thermal stabilization temperature increased, the area of macropores covering the pore size ranging from 100 to 400 μm decreased, while the areas of mesopores and macropores covering the pore size ranging from less than 10 μm relatively increased. In FIG. 14, the total pore area of Comparative Example 1 (CNWF) was 38.69 m$^2$/g, while Examples 1 (C210) and Example 2 (C240) were 17.12 m$^2$/g and 21.96 m$^2$/g, respectively, and showed that surface oxidation due to the thermal stabilization may reduce the pore area. In the case of Example 3 (C270) and Example 4 (C300), as non-carbon atoms (mainly hydrogen atoms) were removed during the thermal stabilization process, the total pore area significantly increased to 54.525 m$^2$/g and 94.693 m$^2$/g, respectively.

This is in good agreement with the XPS analysis results described above, and the bulk density of all samples also showed a similar trend to the result of the total pore area, which means that the porosity increased with the increase of the thermal stabilization temperature. Specifically, it can be seen that Example 3 (C270) and Example 4 (C300) have a significantly high porosity of 91% and 97%, respectively, and a low bulk density of 0.1016 g/mL and 0.1030 g/mL, respectively, and thus, can be efficiently applied to oil evaporation by solar-based heat combined with adsorption due to light weight, high oil adsorption capacity such as high porosity, and high buoyancy.

<Analysis of Photothermal Conversion Properties>

Figure 15:
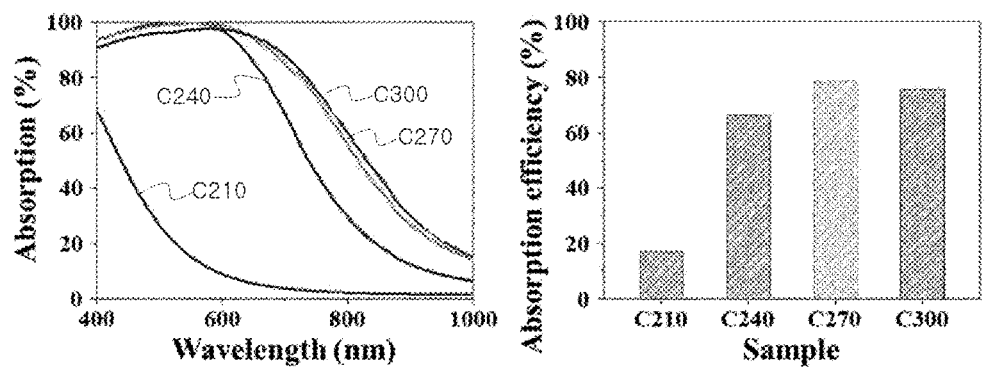
FIG. 15 is a diagram illustrating results of measuring a light adsorption spectrum (left figure) of 1 kW/m$^2$ and 400 to 1000 nm and light adsorption efficiency (right figure) for the oil adsorbents of Example 1 (C210), Example 2 (C240), Example 3 (C270), and Example 4 (C300).
Figure 16:
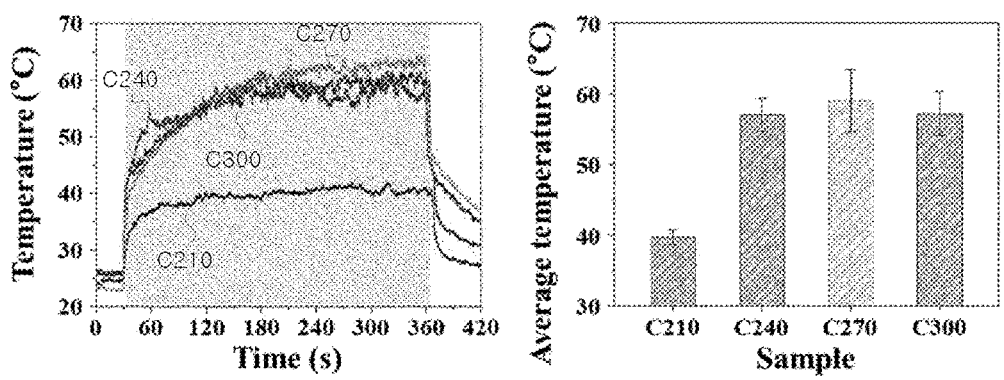
FIG. 16 is a diagram illustrating surface temperatures of the oil adsorbents of Example 1 (C210), Example 2 (C240), Example 3 (C270), and Example 4 (C300) according to solar irradiation, and illustrates results of measuring a recording surface temperature (left figure) and an average surface temperature (right figure) of each oil adsorbent during solar irradiation.

In order to investigate the photothermal conversion effect of the oil adsorbents of Example 1 (C210), Example 2 (C240), Example 3 (C270), and Example 4 (C300), the light adsorption properties were analyzed using a solar simulator (PEC-L01, Peccell Inc., Japan) as a solar source, which is illustrated in FIGS. 15 and 16. In this case, the surface temperature was measured using an infrared camera (FLIR 720001, FLIR Systems Inc., USA).

The light adsorption and photothermal conversion are important properties directly related to the evaporation efficiency of water or organic solvent. FIG. 15 showed the light adsorption spectrum and light adsorption efficiency of 1 kW/m$^2$ and 400-1000 nm light for the oil adsorbents of four samples, Example 1 (C210), Example 2 (C240), Example 3 (C270), and Example 4 (C300). In the left side of FIG. 15, Example 3 (C270) and Example 4 (C300) showed strong light adsorption, which is clearer when comparing the calculated solar adsorption efficiency. In the right side of FIG. 15, Example 1 (C210), Example 2 (C240), Example 3 (C270), and Example 4 (C300) had 16%, 66%, 78% and 76% of solar adsorption efficiency, respectively. Because the nonwoven fabric carbonized at high temperature has a high carbon content, it is close to a pure carbon structure such as black carbon, and thus, Examples 3 (C270) and Example 4 (C300) have excellent solar adsorption efficiency and excellent heat conversion properties.

FIG. 16 illustrates the surface temperatures of the oil adsorbents of Example 1 (C210), Example 2 (C240), Example 3 (C270), and Example 4 (C300) according to solar irradiation, and the left side of FIG. 16 illustrates the recorded surface temperature, and the right side of FIG. 16 illustrates the average surface temperatures of each oil adsorbent when sunlight is irradiated. In the left side of FIG. 16, the surface temperatures of each oil adsorbent rapidly increased after being irradiated with 1 kW/m$^2$ of sunlight. In addition, the exothermic value shown in the right side of FIG. 16 was in good agreement with the solar adsorption efficiency. In the case of Example 3 (C270), the surface temperature was 59.1° C., and had strong solar adsorption properties, and in the case of Example 1 (C210), Example 2 (C240), and Example 4 (C300), the surface temperatures were 39.8° C., 57.0° C. and 57.2° C., respectively. From this, it can be seen that Example 3 (C270) is most suitable as the photothermal conversion material, and therefore, the oil adsorbent of Example 3 (C270) may be expected to act as a good solar absorber as a carbon-based black body.

<Analysis of Organic Solvent Evaporation Properties During Light Irradiation>

Figure 18:
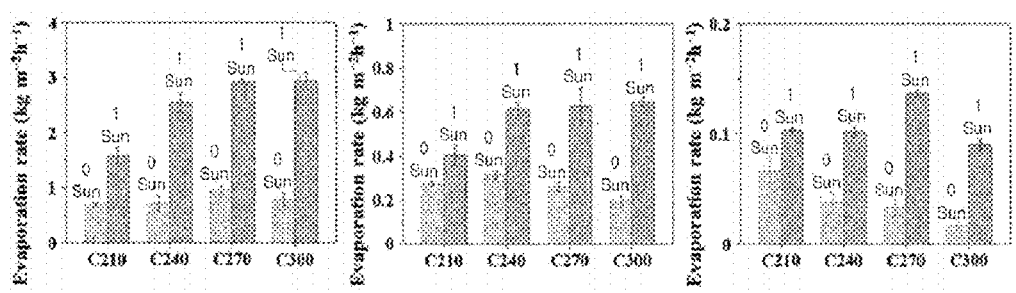
FIG. 18 is a diagram illustrating results of measuring an evaporation rate of octane (left figure), an evaporation rate of decane (middle figure), and an evaporation rate of dodecane (right figure) in an experiment for analyzing the evaporation properties of an organic solvent when light is irradiated. '0 Sun' illustrated in FIG. 18 means a condition in which sunlight is not irradiated, and '1 Sun' means a condition in which sunlight is irradiated, which is used in the same meaning in the drawings below.

The evaporation properties of the organic solvent were analyzed when the oil adsorbents of Example 1 (C210), Example 2 (C240), Example 3 (C270) and Example 4 (C300) were irradiated with sunlight, and the results are illustrated in FIG. 18.

The degree to which the organic solvent is adsorbed onto the adsorbent is an important factor for effective evaporation, and the number of C—C and C=O groups in the adsorbent is related to the reduction of surface energy leading to adsorption of the non-polar solvent. The organic solvent may be continuously adsorbed onto the thermally stable cotton fibers and may be filled in the small pores to form a thin organic solvent layer. The difference in pore diameter and porosity determines the amount of organic solvent adsorption related to the local heating effect. In order to measure the evaporation rate, octane, decane, and dodecane were used as organic solvents of three models with different carbon numbers.

Figure 17:
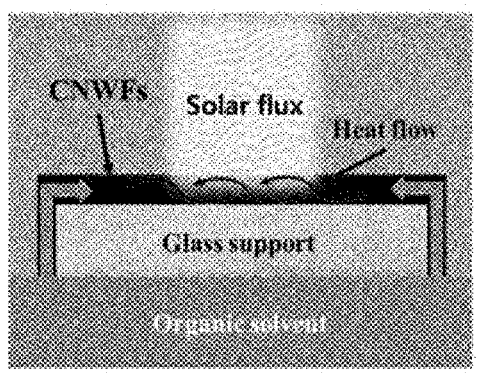
FIG. 17 is a diagram schematically illustrating an experimental method for analyzing evaporation properties of an organic solvent when light is irradiated.

Specifically, the change in mass of the organic solvent due to evaporation during the solar irradiation was measured by two methods. First, as illustrated in FIG. 17, a glass-based support was used as a spacer to minimize the loss of heat generated from the oil adsorbent, which is a heat-stabilized cotton fiber, to a large amount of organic solvent. The organic solvent was supplied to the oil adsorbent through capillary wetting. Second, as illustrated in the left side of FIG. 19, 0.8 g of an organic solvent (octane, decane, dodecane, and a mixed organic solvent of 1:1:1 weight ratio) and 43 g of deionized water were put into a beaker, and a thin layer of the organic solvent was formed on water. After the oil adsorbent was put and irradiated with light, the oil adsorbent was removed from the beaker and the weight loss was measured. The experimental set includes a solar simulator irradiating 1 kW/m$^2$ of light, an electric scale for measuring the change in mass of the organic solvent, and an infrared camera for measuring temperature. In this case, the room temperature was 22-25° C. (24° C.), and the humidity was 18 to 25% (20%).

FIG. 18 illustrates an analysis of the evaporation properties of the organic solvent when the oil adsorbents of Example 1 (C210), Example 2 (C240), Example 3 (C270), and Example 4 (C300) is irradiated with sunlight, FIG. 17 is a diagram schematically illustrating the experimental method, the left side of FIG. 18 illustrates the evaporation rate of octane, the middle side of FIG. 18 illustrates the evaporation rate of decane, and the right side of FIG. 18 illustrates the evaporation rate of dodecane. According to the evaporation result of FIG. 18, Example 3 (C270) was very effective in evaporating the organic solvent because the surface adsorption and light adsorption efficiency of the organic solvent were high. This is due to the high carbon content and high pore properties (high porosity and small pore diameter), which is advantageous for local heating of organic solvents.

Figure 19:
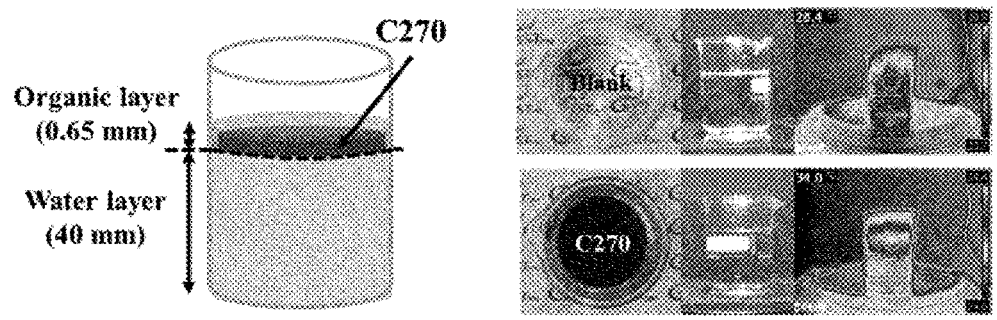
FIG. 19 is an image (left figure) schematically illustrating an organic evaporation experiment designed by reproducing a similar environment such as a river or sea contaminated with organic matters for the oil adsorbent of Example 3 (C270) and an image (right figure) of a state, in which heat is locally emitted by photothermal conversion, observed using a thermal imaging camera. 'Blank' illustrated in FIG. 19 means a condition in which the oil adsorbent is not used, which is used in the same meaning in the following drawings.
Figure 20:
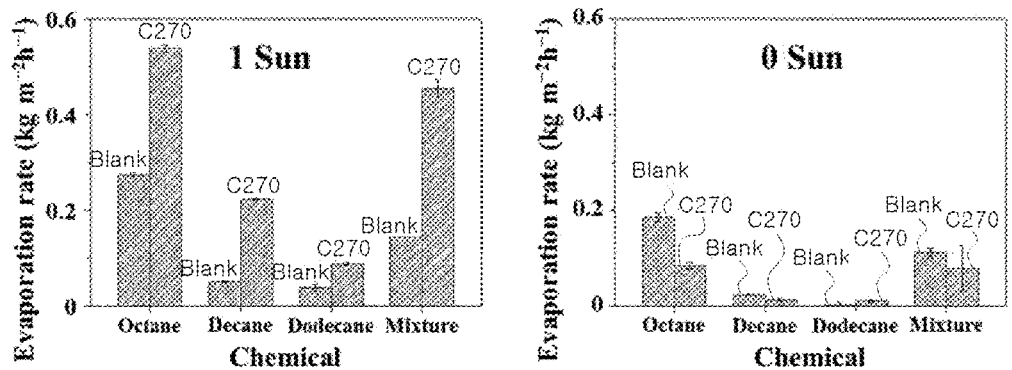
FIG. 20 is a diagram illustrating the evaporation rate (left figure) of the organic solvent according to the presence or absence of the oil adsorbent when sunlight is irradiated and the evaporation rate (right figure) of the organic solvent according to the presence or absence of the oil adsorbent when sunlight is not irradiated.

In addition, with respect to the oil adsorbent (C270) of Example 3, an organic evaporation experiment was designed and measured in an actual situation in which oil was adsorbed in the aqueous phase from which oil was leaked by reproducing a similar environment such as a river or a sea contaminated with organic matters, and the results are illustrated in FIGS. 19 and 20.

The left side of FIG. 19 schematically illustrates a state in which the oil adsorbent is put into the interface between organic matters and water, and the organic layer on the water was formed as a thin layer of 0.65 mm. The right side of FIG. 19 is an image obtained by observing a state, in which the oil adsorbent is positioned at the interface between the organic phase and the aqueous phase during light irradiation and heat is actually emitted by the photothermal conversion, by a thermal imaging camera. When there is no oil adsorbent, a uniform temperature distribution was shown in the entire solvent, whereas when an oil adsorbent was put, the organic solvent had a locally high temperature at the interface between the organic phase and the aqueous phase due to the photothermal conversion of the oil adsorbent and the thermal diffusion suppression.

FIG. 20 illustrates the evaporation rate of the organic solvent according to the presence or absence of the oil adsorbent and the presence or absence of the solar irradiation. In this experiment, three kinds of organic solvents (octane, decane, and dodecane) and a mixed organic solvent in which the three kinds of organic solvents were mixed at a 1:1 weight ratio were used. In the left side of FIG. 20, when light is irradiated, for octane, decane and dodecane, the case where there is the oil adsorbent had 2 times, 4.4 times, 2.3 times, and 3.2 times higher evaporation rates, respectively, compared to the case where there is no oil adsorbent. On the other hand, in the right side of FIG. 20, when no light was irradiated, the evaporation rate was lower by about 40 to 60% when there is the oil adsorbent.

<Analysis of Evaporation Properties of Crude Oil During Light Irradiation>

Oil spills are always likely to occur in the exploration, production and transportation of hydrocarbons, and the problem of large-scale oil spills causes serious environmental pollution because it takes a long time for the ecosystem to self-clean the oil. Therefore, a strategy to cope with the problem is essential.

The analysis of the evaporation properties of crude oil during solar irradiation was performed in the same manner as that performed in the above 'analysis of evaporation properties of organic solvents during solar irradiation'. To analyze the evaporation properties of crude oil during solar irradiation, 43 g of deionized water and crude oil (1 g, 1.5 g, and 2.5 g) were added to a beaker to form three different amounts of crude oil layers on water. Then, the oil adsorbent (C270) of Example 3 was positioned at the interface between crude oil and water, and after light irradiation, the oil adsorbent was removed from the beaker, and then the weight loss was measured. The experimental set includes a solar simulator irradiating 1 kW/m$^2$ of light, an electric scale for measuring the change in mass of the organic solvent, and an infrared camera for measuring temperature. In this case, the room temperature was 22-25° C., and the humidity was 18 to 25%.

Figure 21:
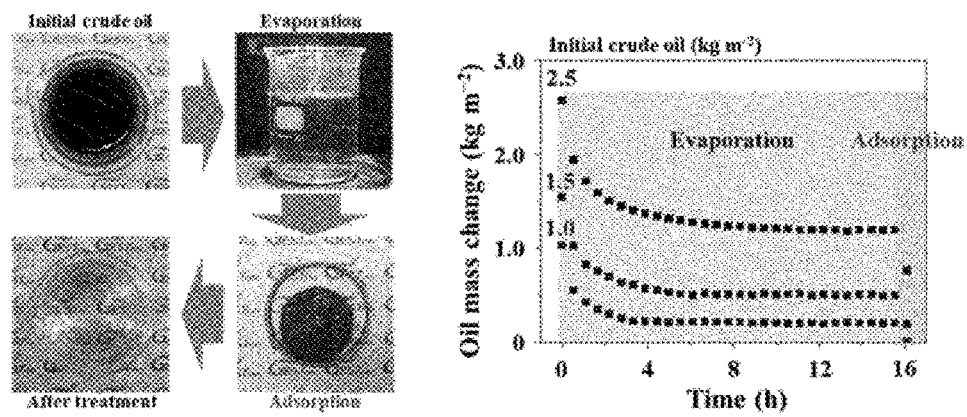
FIG. 21 is a diagram illustrating two oil treatment operations (left figure) using the oil adsorbent (C270) of Example 3 and a change in mass of crude oil (right figure) by solar irradiation.

The left diagram of FIG. 21 presents a new strategy for high-efficiency treatment of crude oil spilled into the aqueous phase. The oil adsorbent (C270) of Example 3 drifted between the interface of the aqueous phase layer and the crude oil layer, and the initial crude oil (2.5 kg/m$^2$, 1.5 kg/m$^2$, and 1.0 kg/m$^2$) is treated by the two-step process of the oil adsorbent. The oil adsorbent (C270) of Example 3 evaporates crude oil in a high-efficiency manner as it has the high photothermal conversion and thermal diffusion suppression properties, and continues to attract crude oil in the diffused oil layer due to strong adsorption by the low surface energy of the adsorbent during the evaporation process. Thereafter, the evaporated crude oil is finally adsorbed and removed by the adsorbent.

As such, it was confirmed that the practical applicability and compatibility of purification through an adsorbent was very high when a large-scale oil spill occurred. The right side of FIG. 21 is an oil mass change graph, and illustrates that crude oil purification by two oil treatment steps of the oil adsorbent (C270) of Example 3 is effectively performed. Crude oil is a complex mixture of hydrocarbons with various compositions, and the graph shows that the rate of mass change gradually decreases due to the difference in boiling points. The low-boiling hydrocarbons evaporated first, so the oil mass change rate was fast at the beginning of evaporation, and the mass change rate gradually decreased as time passed. The initial crude oil no longer evaporated at 2.5 kg/m$^2$ after 12 hours, at 1.5 kg/m$^2$ after 6 hours, and at 1.0 kg/m$^2$ after 4 hours. The hydrocarbons with high boiling point remaining after evaporation are adsorbed to the oil adsorbent and removed by recovery of the adsorbent. When the initial crude oil volume was 1.0 kg/m$^2$ and 1.5 kg/m$^2$, the removal efficiencies were 94% and 88%, respectively. However, when the initially formed crude layer was 2.5 kg/m$^2$, the removal efficiency was lowered to 69%.

Figure 22:
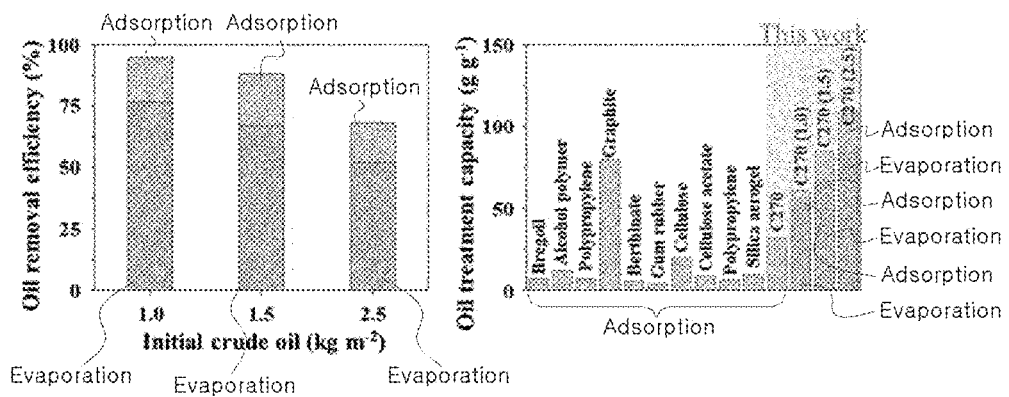
FIG. 22 is a diagram illustrating a difference in removal efficiency of crude oil (left figure) and the crude oil processing capacity of embodiments of the present invention and other technologies by solar irradiation (right figure).

The adsorption is a method for cleaning up crude oil spills, and general adsorbents have a limit in their high adsorption capacity. On the other hand, the oil purification method according to embodiments of the present invention focuses on two steps (evaporation and adsorption) to overcome the limitation of the adsorbent that depends only on the lipophilic adsorption mechanism, and the difference in crude oil processing capacity between embodiments of the present invention and other technologies is illustrated on the right side of FIG. 22. Comparing crude oil adsorption with previous studies, the oil purification method according to embodiments of the present invention shows the highest efficiency of 32 g/g excluding graphite. However, graphite has a sharp decrease in its adsorption capacity at large densities, making it difficult to treat large-scale oils. According to embodiments of the present invention, the only energy input is sustainable solar energy, and embodiments of the present invention are commercially very useful technologies capable of large-scale oil treatment, such as increasing the oil treatment capacity as the initial crude oil content increases.

In addition, the composition of the evaporated oil can be found by comparing the accumulated mass fraction of the initial crude oil and the crude oil adsorbed to the oil adsorbent. Specifically, the crude oil adsorbed to the oil adsorbent was irradiated with sunlight for 16 hours after the oil adsorbent (C270) of Example 3 was put into the initial crude oil. As a result, 77 wt % of the initial crude oil was removed by evaporation, which is illustrated in FIG. 23.

Figure 23:
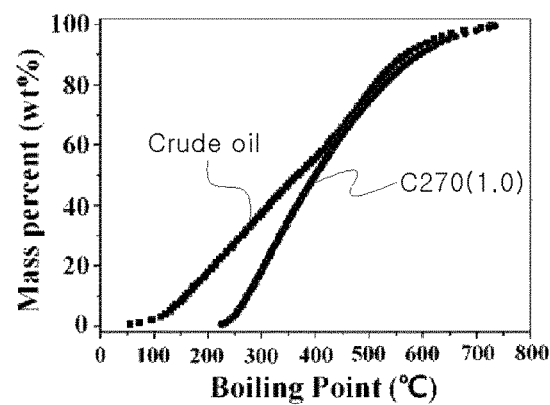
FIG. 23 is a diagram illustrating the measurement of a cumulated mass fraction of initial crude oil and crude oil adsorbed to the oil adsorbent.

According to FIG. 23, low-boiling hydrocarbons having a boiling point of 226° C. or less occupy 20% of the total mass, and are completely removed by evaporation. Hydrocarbons having a boiling point of 226° C. or less include gasoline, naphtha, kerosene, jet fuel, dodecane, and the like. On the other hand, the high-boiling hydrocarbons having a boiling point of 226 to 450° C. include diesel and atmospheric residues, and were not completely removed, but significant amounts of high-boiling hydrocarbons were removed. As a result of the experiment, it was found that the oil adsorbent (C270) of Example 3 has high photothermal conversion and thermal diffusion suppression properties, so that it can evaporate hydrocarbons having high boiling points as well as hydrocarbons having low boiling points.

The oil adsorbent manufactured by the manufacturing method according to embodiments of the present invention can adsorb and evaporate oil having various carbon numbers ranging from a low boiling point to a high boiling point to remove the oil.

The oil adsorbent manufactured by the manufacturing method according to embodiments of the present invention can have photothermal conversion efficiency, high evaporation efficiency of oil by sunlight, and a high adsorption amount and high adsorption rate, thereby making the adsorption-evaporation cycle fast and efficiently performing the adsorption-evaporation.

The oil adsorbent manufactured by the manufacturing method according to embodiments of the present invention can have an environmentally friendly effect that does not cause any environmental problems even if the oil adsorbent is put into a river, a sea, or the like and then lost.

The oil adsorbent manufactured by the manufacturing method according to embodiments of the present invention can have excellent buoyancy and stably drift on a surface of an aqueous phase.

Although the disclosure hereof is detailed and exact to enable those skilled in the art to practice embodiments of the invention, the embodiments disclosed herein are merely examples of the disclosure, which may be embodied in other specific structure and/or configuration. While various embodiments have been described, the details may be changed without departing from the disclosure, which is defined by the claims.

What is claimed is:

1. A method for manufacturing an oil adsorbent, comprising: performing heat treatment on a non-woven fabric for carbonization in an air atmosphere,
   wherein the carbonization is performed at 200 to 400° C.,
   wherein the oil adsorbent has micropores of less than 2 nm, mesopores of 2 to 50 nm, and macropores of 50 nm or more.

2. The method of claim 1, wherein in the performing of the heat treatment, the carbonization is performed at 220 to 300° C.

3. The method of claim 1, wherein the ratio of the number of oxygen atoms in the oil adsorbent, O, to the number of carbon atoms in the oil adsorbent, C, satisfies the condition that $0.1<O/C<0.9$.

4. An oil adsorbent that is a carbonized non-woven fabric, wherein the ratio of the number of oxygen atoms in the oil adsorbent, O, to the number of carbon atoms in the oil adsorbent, C, satisfies the condition that $0.1<O/C<0.9$,
   wherein the non-woven fabric is carbonized at 200 to 400° C.,
   wherein the oil adsorbent has micropores of less than 2 nm, mesopores of 2 to 50 nm, and macropores of 50 nm or more.

5. A method of purifying oil spilled into an aqueous phase by removing the oil spilled into the aqueous phase using the oil adsorbent manufactured by the manufacturing method of claim 1, the method comprising:
   adsorbing the oil by putting the oil adsorbent into a surface of the aqueous phase from which the oil has spilled; and
   evaporating the oil by irradiating light to the oil adsorbent to which the oil is adsorbed.

6. The method of claim 5, wherein in the adsorbing, the oil adsorbent is located at an interface of the aqueous phase and the oil phase so that the oil is adsorbed.

7. The method of claim 5, further comprising:
   after the evaporating, recovering the oil adsorbent where the oil is adsorbed and evaporated.

8. The method of claim 5, wherein the oil contains an organic carbon compound having 3 to 23 carbon atoms.

\* \* \* \* \*